United States Patent [19]

Noireaux et al.

[11] Patent Number: 5,091,485
[45] Date of Patent: Feb. 25, 1992

[54] LOW VISCOSITY, CROSSLINKABLE LIQUID POLYSILANES

[75] Inventors: Patrick Noireaux, Le Mans; Jean Jamet, Carignan de Bordeaux; Michel Parlier, Voisins-le-Bretonneux; Marie-Pierre Bacos, Sceaux, all of France

[73] Assignees: National d'Etudes et de Recherches Aerospatiales (ONERA), Chatillon; Institut de Recherche/Appliquee sur les Polymeres, Le Mans, both of France

[21] Appl. No.: 469,024

[22] Filed: Jan. 23, 1990

[30] Foreign Application Priority Data

Jan. 23, 1989 [FR] France ................. 89 00764

[51] Int. Cl.⁵ .......................................... C08F 283/00
[52] U.S. Cl. ..................................... 525/478; 528/10; 528/31; 528/32; 556/430
[58] Field of Search ................. 556/430; 528/10, 31, 528/32; 525/478

[56] References Cited

U.S. PATENT DOCUMENTS

| | | | |
|---|---|---|---|
| 3,431,221 | 3/1969 | Hoess | 260/2 |
| 4,472,591 | 9/1984 | Schilling et al. | 556/430 |
| 4,611,035 | 9/1986 | Brown-Wensley et al. | 556/430 |
| 4,783,516 | 11/1988 | Schilling et al. | 556/430 |

FOREIGN PATENT DOCUMENTS

0052694 6/1982 European Pat. Off. .
0123934 10/1986 European Pat. Off. .

Primary Examiner—John C. Bleutge
Assistant Examiner—Margaret W. Glass
Attorney, Agent, or Firm—Burns, Doane, Swecker & Mathis

[57] ABSTRACT

Low viscosity, crosslinkable polysilanes that are liquid at ambient temperatures and essentially free of volatiles, well adapted for conversion into silicon carbide ceramics at elevated temperatures, are prepared by (a) reacting at least one silane monomer of the formula (1):

$$R^1R^2SiCl_2 \quad (1)$$

in which $R^1$ is a hydrogen atom or a hydrocarbon radical and $R^2$ is a vinyl radical, with at least one organic or organosilicon monochlorinated comonomer, in the presence of molten sodium in an organic solvent and wherein the ratio $r_1$ of the number of moles of the silane monomer of formula (1) to the number of moles of the monochlorinated comonomer ranges from 0.5 to 2 and the solvent includes toluene and dioxane, (b) cooling the reaction medium and separating it, characteristically by filtration, into (i) a liquid phase which includes such solvent and the major fraction of low molecular weight polysilane in liquid and/or dissolved state and (ii) a solid phase which includes sodium, sodium chloride and high molecular weight polysilane, and (c) recovering desired low viscosity polysilane from such liquid phase and preferably oxidizing the sodium present in the solid phase.

26 Claims, 2 Drawing Sheets

LOW VISCOSITY, CROSSLINKABLE LIQUID POLYSILANES

BACKGROUND OF THE INVENTION

1. Field of the Invention

The present invention relates to improved polysilanes and to a novel process for the preparation of polysilanes and to the use of the final product polysilanes for the production of ceramic materials based on silicon carbide, whether in the form of coatings or matrices

2. Description of the Prior Art

EP-B-0,123,934 describes a process for the preparation of polysilanes comprising ethylene groups and hydrogen atoms bonded to silicon atoms, by reacting silane monomers such as $CH_3(CH_2=CH)SiCl_2$, $CH_3HSiCl_2$ and $(CH_3)_3SiCl$ with sodium molten in an organic solvent.

According to this '934 patent, the simultaneous presence of ethylene groups and hydrogen atoms bonded to silicon atoms permits the crosslinking of the polymer by increasing the temperature, essentially without any loss in weight, such crosslinking facilitating conversion of the polysilanes into silicon carbide in a subsequent heat treatment.

The process of EP-B-0,123,934 also entails a sodium oxidation stage prior to the filtering of the reaction medium.

Such a stage makes it difficult to filter the reaction mixture. It thus becomes necessary to filter it several times after decantation in order to isolate the polymer.

Furthermore, the polymer obtained according to the process of EP-B-0,123,934 has a milky appearance, caused by washing it prior to filtration. This turbidity appears to be due to the formation of microgels in suspension in the polymer, which presents certain disadvantages, in particular on the experimental level (certain product analyses are difficult to carry out, for example analysis by gel permeation chromotography), as well as in the end use of the product, such as the impregnation of fine cavities with the polymer.

SUMMARY OF THE INVENTION

Accordingly, a major object of the present invention is the provision of an improved process for the preparation of polysilanes that are liquid at ambient temperature, which improved process conspicuously ameliorates those disadvantages and drawbacks to date characterizing the state of this art.

Another object of the present invention is the provision of crosslinkable polysilanes in relatively high yield that are liquid at ambient temperature and have sufficiently low viscosities as to permit good impregnation of an intertangled mass of reinforcing fibers therewith, ultimately to produce a matrix reinforced by such fibers, useful as such or after the conversion of the polysilanes into silicon carbide by a downstream heat treatment.

Yet another object of this invention is the provision of polysilane polymers useful as heat-durable resins for the production of nonreinforced blocks or shaped articles by molding.

Briefly, the present invention features a process for the preparation of polysilanes that are liquid at ambient temperature (20° C.), comprising reacting at least one silane monomer of the formula:

$$R^1R^2SiCl_2 \qquad (1)$$

wherein $R^1$ is a hydrogen atom or a hydrocarbon radical and $R^2$ is a vinyl radical, with at least one organic or organosilicon monochlorinated monomer, in the presence of molten sodium in an organic solvent, in which the ratio $r_1$ of the number of moles of the silane monomer of formula (1) to the number of moles of the monochlorinated monomer ranges from 0.5 to 2 and the organic solvent is essentially toluene and dioxane, next separating the cooled reaction medium by filtration into a liquid phase containing the solvent and the major fraction of the low molecular polysilane, in the liquid and/or dissolved state, and a solid phase including the sodium, sodium chloride and possibly the high molecular weight fraction of the polysilanes, and thereafter recovering the liquid polysilane from the liquid phase and treating the solid phase to oxidize the residual sodium values.

DETAILED DESCRIPTION OF THE PREFERRED EMBODIMENTS OF THE INVENTION

Figure 1:
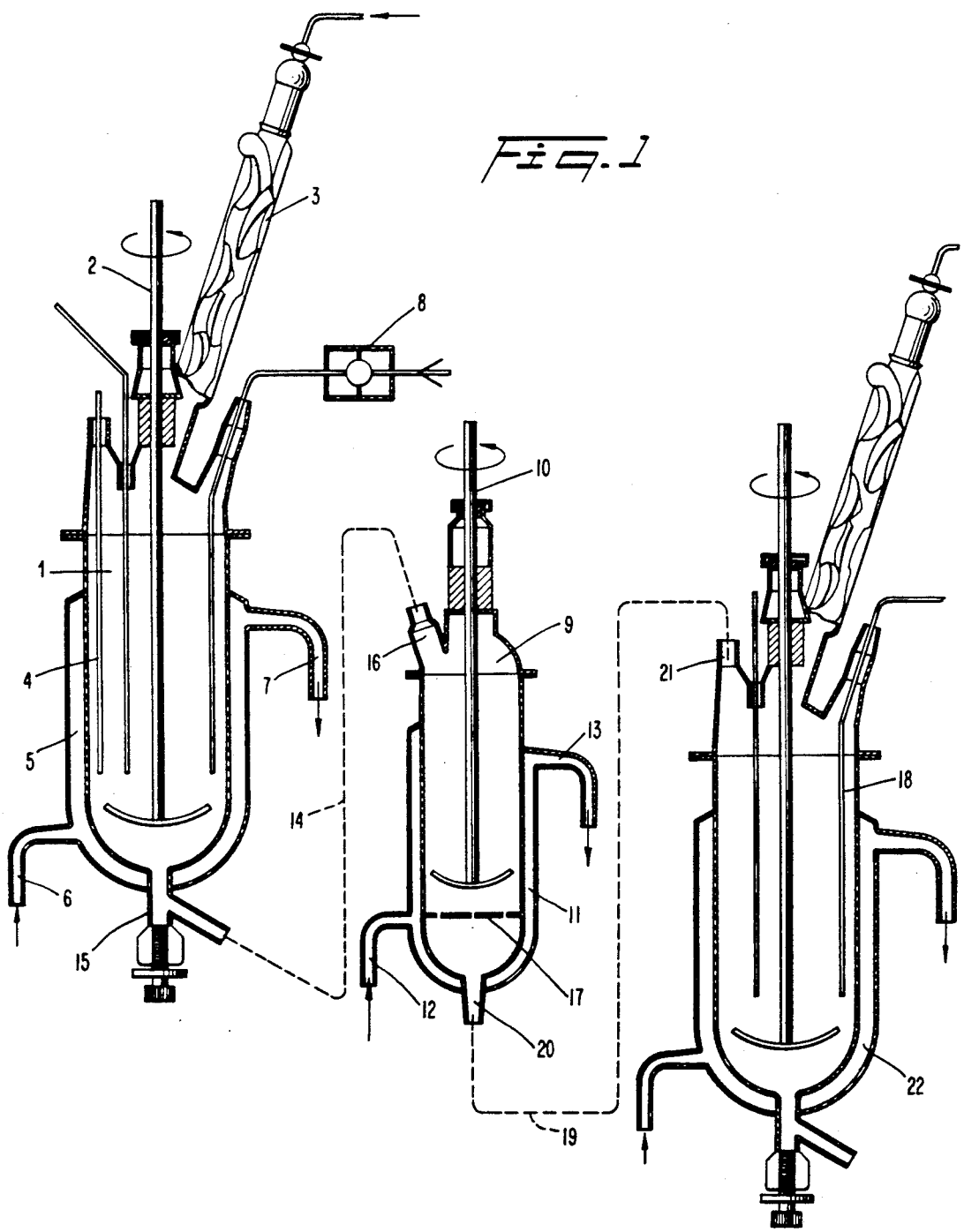
FIG. 1 is a front cross-sectional view of suitable apparatus for carrying out the polymerization according to the invention.

More particularly according to the present invention, the oxidation of the residual sodium is carried out by the addition of water or alcohol, which renders the medium basic. In such a medium, the polysilanes undergo secondary reactions, which increase their molecular weight and partially converts them into polysiloxanes.

The present invention, by virtue of the prior separation of the liquid polysilane by filtration, makes it possible to prevent an increase in viscosity and the formation after heat treatment of a silica that would be harmful to the properties of the silicon carbide matrix.

Advantageously, it has now been found that according to the process of the invention the prior filtration is carried out readily: the two phases separate very easily.

The selection of the solvent, together with the filtration prior to the oxidation of the residual sodium, make it possible to crosslink the polysilane thus produced at temperatures ranging from 50° to 400° C. with a very minor loss in weight in a manner that is more satisfactory than the process according to EP-B-0,123,934. Indeed, the content in volatile material over the course of such crosslinking is very low relative to other known processes. Furthermore, the index of polydispersity is much lower according to the process of the present invention than that according to EP-B-0,123,934.

Quite unexpectedly and surprisingly, it has now been discovered that the polymer produced by the process of the invention has a low molecular weight and that the presence of dioxane as a solvent favors the action of the monochloride monomer as an agent blocking the ends of the polymer chains.

Although alkali metals other than sodium, in particular potassium, are also suitable for use in preparing polysilanes by reaction with halosilanes, sodium is selected because, as a practical matter, it does not attack the vinyl groups under the conditions of the reaction. The sodium metal is preferably slightly in excess relative to the chlorine groups, such that all of the chlorine atoms present will be reacted.

It will be appreciated that it is possible to react other chlorosilane monomers with those of formula (1) and with organic or organosilicon monochloride monomers.

Thus, in a preferred embodiment of the invention, the chlorosilane monomers of formula (1) and the monochloro monomers react with at least one chlorosilane monomer of the general formula:

$$R^1HSiCl_2 \quad (2)$$

in which $R^1$ is as defined above.

In an even more preferred embodiment of the invention, the $r_2$ ratio of the number of moles of the chlorosilanes of formula (1) to the number of moles of chlorosilane monomers of formula (2) ranges from 2 to 3.3 and the ratio $r_3$ of the number of moles of the monochloro monomer to the number of chlorosilane monomers of formulae (1) and (2) ranges from about 0.2 to 0.8.

The molar ratios are selected as to provide in the liquid phase, upon completion of the reaction, a low viscosity polysilane, substantially free of volatile fractions. The presence of a volatile fraction in the polymer during the heat treatment to convert it into silicon carbide would effect a deleterious release of gases, and its prior elimination would require an additional operation and result in a loss of total yield.

The organic monochloro monomer is, for example, a benzyl chloride. In this case the $r_3$ ratio advantageously ranges from approximately 0.2 to 0.6.

Alternatively, the monochloro monomer may be an organosilicon compound of the formula:

$$R^1{}_3SiCl \quad (3)$$

in which $R^1$ is as defined above and the $r_3$ ratio then preferably ranges from 0.4 to 0.8.

In a particularly preferred embodiment of the invention, the molar proportions of the monomers of formulae (1) and (2) and the monochloro monomer are respectively 0.76:0.24:0.4.

The liquid polysilane copolymer prepared by the process of the invention may have a viscosity less than about 20 poises at ambient temperature and less than about 1 poise at 100° C. This low viscosity at ambient temperature makes it possible to easily fill a cavity of an autoclave with such polysilanes for purposes of impregnating reinforcing fibers therewith, and then to crosslink same and, finally, convert them into silicon carbide. The low viscosity at 100° C. permits the polysilane to perfectly impregnate the fibers prior to the onset of the crosslinking reaction.

The liquid polysilane copolymer according to the invention may advantageously be mixed with a polysilane homopolymer comprising -SiR$^1$H- recurring units, with $R^1$ being as defined above. Such a homopolymer constitutes a reactive diluent which further reduces the viscosity of the mixture and which may be co-crosslinked with the polysilane copolymer without weight loss of material, by reaction of its hydrogen atoms bonded to the silicon with the ethylene groups of the copolymer.

The liquid polysilane homopolymer may be produced by reacting a monomer of the formula R$^1$HSiCl$_2$, with $R^1$ being as defined above, and a benzyl halide with molten sodium, in an organic solvent. The use of a benzyl halide, i.e., a nonsilicon monomer, as the chain terminating agent in the preparation of the polysilane copolymer and/or of the polysilane homopolymer, reduces the amount of silicon in the final polymer, thereby making possible to modulate the silicon/carbon ratio in the final silicon carbide produced from the polysilane mixture.

A more regular distribution of the molecular weight of the homopolymer is realized by conducting the operation in the presence of sodium iodide.

In order to further illustrate the present invention and the advantages thereof, the following specific examples are given, it being understood that same are intended only as illustrative and in nowise limitative.

In said examples to follow:
(i) $\overline{M}n$ designates number average molecular weight;
(ii) $\overline{M}w$ designates weight average molecular weight;
(iii) I indicates the polydispersity index:

$$\overline{M}w/\overline{M}n;$$

(iv) Vi represents the vinyl radical; and
(v) Me represents the methyl radical.

These values were obtained from analyses carried out by gel permeation chromatography (GPC: polystyrene calibration using microstyragel columns).

Also in said examples to follow, all parts and percentages are given by weight, except where otherwise indicated.

EXAMPLE 1

This example relates to the preparation of a polysilane copolymer employing the apparatus illustrated in FIG. 1.

Into a pyrex glass reactor 1, equipped with a rotating agitator 2 operated by a motor, not shown, a reflux condenser 3 and a thermal probe 4, under a nitrogen atmosphere, a mixture of 75% by weight toluene and 25% by weight dioxane was introduced, followed by addition of sodium in an amount of approximately one atom for each chlorine atom contained in the monomers to be reacted. The mixture was heated to 105° to 110° C. by circulating hot oil in a jacket 5 surrounding the outside wall of the reactor and having an inlet 6 and an outlet 7 for the oil. Vigorous agitation by means of the agitator 2 permitted good distribution of the molten sodium. A mixture was then introduced, drop-by-drop, of the three monomers CH$_3$(CH$_2$=CH)SiCl$_2$, CH$_3$HSiCl$_2$ and (CH$_3$)$_3$SiCl, in the proportion indicated below, by means of a metering pump 8. During this addition, the temperature of the oil circulating in the jacket 5 was reduced to 80° C. and the temperature of the reaction mixture was maintained above 100° C. by regulating the flow rate of the pump 8, additional heat being provided by the exothermic reaction of reducing polymerization. Following this addition, the medium was maintained at reflux for 1 to 2 hours.

Following cooling of the mixture, a volume of toluene equivalent to the initial volume of the toluene/dioxane solvent was added. The mixture was then transferred by gravity, under reduced pressure, into a second pyrex glass reactor 9 equipped as the first reactor, having a rotating agitator 10 and a fluid circulation jacket 11, an inlet 12 and an outlet 13. The transfer was carried out by means of a pipe 14 communicating with a lower outlet 15 of the reactor 1 and opening into an inlet opening 16 of the upper region of the reactor 9. Toluene was then circulated at −5° C. in the jacket 11. A filter 17 placed horizontally across the reactor 9 collected the smaller solid fraction of the mixture, the solution then being transferred by reduced pressure into a third reactor 18 similar to the reactor 9, by means of a pipe 19 communicating with a lower outlet 20 of the reactor 9 and opening into an upper inlet opening 21 of the reactor 18. Toluene was circulated at −5° C. in the jacket 22.

obtained following the procedure described above, but by replacing $CH_3HSiCl_2$ with $(CH_3)_2SiCl_2$, and weight losses of 21 to 24% were obtained using only $CH_3(CH_2=CH)SiCl_2$ as the bifunctional monomer.

At 1000° C., the temperature of conversion into silicon carbide, the weight loss of the polysilane according to the invention was 32 to 40% instead of 40 to 52% for the polysilane containing the $-Si(CH_3)_2-$ unit.

Furthermore, for $r_2=3.3$ and $r_3=0.4$ or 0.6, a viscosity less than about 20 poises was measured at ambient temperature and less than about 1 poise at 100° C.

TABLE 1

| $r_2$ | $r_3$ | Yield (%) | | NMR $^1$H | | Chromatography | |
|---|---|---|---|---|---|---|---|
| | | liquid | insoluble | MeHSi (%) | MeViSi (%) | Mw | Mn |
| 2 | 0.4 | 65 | 12 | 15 | 34 | 7100 | 750 |
| | 0.6 | 62 | 8 | 12 | 29 | 2400 | 610 |
| | 0.8 | 50–56 | 7–8 | 12 | 21–27.5 | 2000–3700 | 580–680 |
| 3.16 | 0.4 | 64–70 | — | 11–12 | 37–38 | 2800–3450 | 630–670 |
| 3.3 | 0.4 | 60–76 | 8.3 | 10–11 | 31–35 | 3080–4500 | 550–580 |
| | 0.5 | 71–73 | 14–17 | 7–12 | 28–31 | 2050–2350 | 540–560 |
| | 0.8 | 67 | 6 | 12 | 24 | 1860 | 475 |

The polysilane in solution collected in the reactor 18 was washed two or three times with water and dried on sodium sulfate. After filtering the solution, the solvents were evaporated under reduced pressure and the polymer dried for 4 to 6 hours at 50° C. under a pressure of about 0.7 millibar.

In order to destroy the residual sodium, toluene was initially added to the reactor 9 to resuspend the solid phase retained on the filter, followed by the slow addition of 95% ethanol until the sodium was completely consumed. After the addition of water to completely dissolve the sodium chloride and sodium alcoholate, only polysilanes having a relatively high molecular weight and which were insoluble in the usual solvents remained in the solid phase, which could be separated to determine the amount thereof and to evaluate the total yield of the polymerization reaction.

Table 1 reports the results, yields and certain characteristics obtained for different values of the $r_2$ and $r_3$ ratios.

In said Table 1, the yields were calculated by comparing the theoretical weight of the polysilane corresponding to the complete reaction of the monomers used, on the one hand with the weight of the liquid polysilane collected from the filtrate transferred to the reactor 18, and, on the other, with that of the insoluble polymer contained in the cake retained on the filter 17.

The values reported in the columns "NMR $^1$H" represent an estimate of the content in the $-CH_3HSi-$ and $CH_3(CH_2=CH)Si-$ units calculated from the relative surfaces of the peaks due to the SiH and $Si-CH=CH_2$ protons in the nuclear magnetic resonance of the proton.

In the "chromatography" columns, the average molecular weights, calculated by steric exclusion chromatography, are reported (microstyragel columns $10^4$, $10^3$, 500 and 100 Å, polystyrene calibration).

In certain cases, minimum and maximum values corresponding to different lots are reported.

The weight loss of the polysilane according to the invention has also been determined. At 300° C., the temperature at which crosslinking takes place, a weight loss not exceeding 8% was observed for samples obtained by selecting $r_2=2$ and $r_3=0.4$, 0.6 or 0.8, and a weight loss of about 2% with $r_2=3.3$ and $R_3=0.4$ or 0.6. For comparison, weight losses of 9 to 24% were

EXAMPLE 2

The procedure of Example 1 was repeated, but using as the monofunctional monomer benzyl chloride in place of trimethylchlorosilane, with the toluene/dioxane ratio being 75/25 or 50/50.

This ratio is indicated in the "Solvent" column of the following Table 2 wherein the results are reported. The yields were calculated as in Example 1.

The values indicated in the "Fractions" columns were obtained by redissolving the polymer collected in the reactor 18 in toluene and pouring the resulting solution into isopropanol. L1 represents the fraction with the lowest molecular weight, which remained in solution in the toluene/isopropanol mixture, and L2 the fraction having a higher molecular weight, which precipitated.

TABLE 2

| $r_2$ | $r_3$ | Solvent | Yield (%) | | Fractions | |
|---|---|---|---|---|---|---|
| | | | liquid | insoluble | L1 (%) | L2 (%) |
| 0.3 | 3.3 | 75/25 | 44 | 32 | 71 | 29 |
| 0.4 | 3.3 | 75/25 | 37–55 | 14–28.5 | — | — |
| | | | 44 | 32 | — | — |
| | | | | | 83 | 17 |
| 0.6 | 3.3 | 75/25 | 6.5 | 1 | 100 | — |
| 0.2 | 3.3 | 50/50 | 45 | 30 | 60 | 40 |
| 0.3 | | | 59 | — | — | — |
| 0.4 | 3.3 | 50/50 | 56–66 | — | 71–75 | 25–29 |
| 0.2 | 2 | 50/50 | 54 | 38 | 55 | 45 |
| 0.3 | | | 73 | — | 69 | 31 |
| 0.4 | | | 66 | — | — | — |

EXAMPLE 3

Employing the apparatus of FIG. 1 and following the procedure of Example 1, one mole of $CH_3HSiCl_2$ and 0.4 mole of benzyl chloride were reacted with 2.4 moles of sodium in the presence of 5 g sodium iodide.

130 g of a soluble polymer were produced, representing a yield of 81%.

Figure 3:
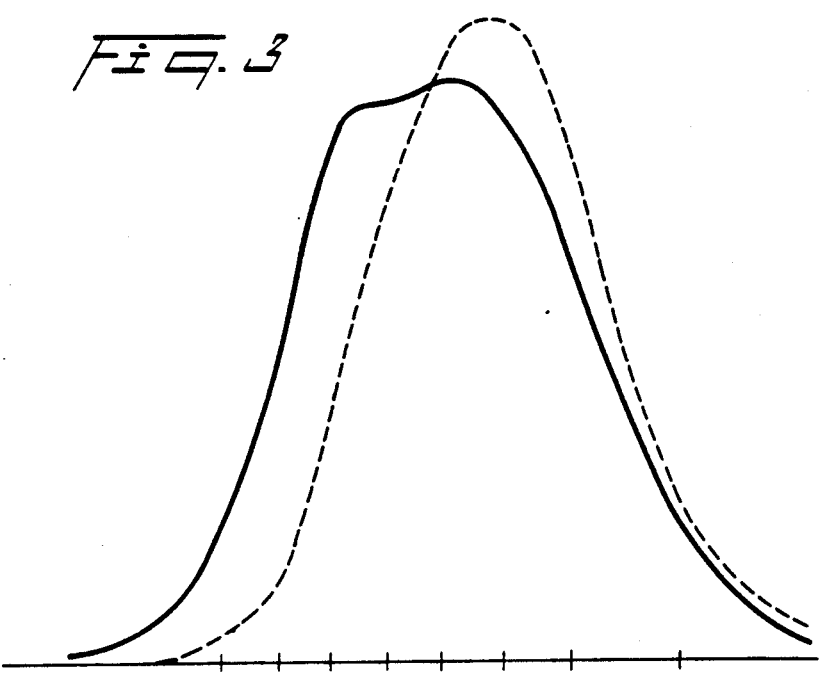
FIG. 3 is a chromatogram obtained by steric exclusion chromatography of the same product of FIG. 2, but after removal of the volatile fraction therefrom.
Figure 2:
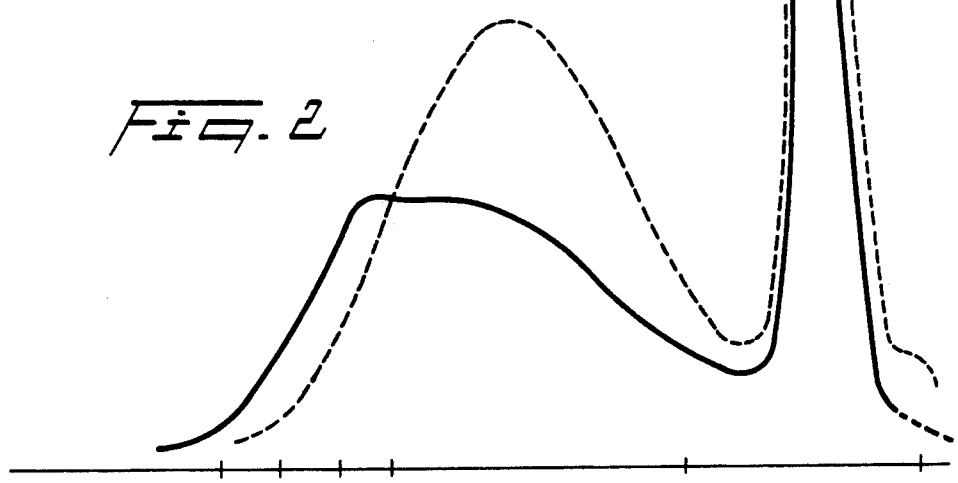
FIG. 2 is a chromatogram obtained by steric exclusion chromatography of a polysilane homopolymer according to the invention.

The broken line curve of FIG. 2 represents a chromatogram of this product, obtained by steric exclusion chromatography under the conditions indicated above relative to Table 1. Following the distillation of the volatile fraction, the chromatogram shown by the broken line in FIG. 3 was obtained for the residue.

EXAMPLE 4

The procedure of Example 3 was repeated, but eliminating the sodium iodide. For the product, before and after the distillation, the chromatographs shown by a solid line in FIGS. 2 and 3 were obtained.

It was thus determined that the presence of the sodium iodide provided a better homogeneity of molecular weights.

EXAMPLE 5

The procedure of Example 3 was repeated, using a mixture of toluene and dioxane. An 80% yield of a soluble polymer was obtained. Analyses were carried out by nuclear magnetic resonance and steric exclusion chromatography on the residue obtained after elimination of the volatile fraction by distillation at 100° C. under a pressure of $1.3 \times 10^{-6}$ bar. The percentages of the $C_6H_5CH_2$, $CH_3HSi$ and $CH_3Si$ groups, calculated by nuclear magnetic resonance, respectively were 14, 61 and 25. The average molecular weights, calculated by steric exclusion chromatography, were 840 for the weight average and 430 for the number average.

The products obtained by crosslinking the polysilane copolymer according to the invention, or the mixture of the polysilane copolymer and homopolymer, were thermosetting in character and could be used directly, without subsequent conversion to silicon carbide, as the matrix for composite materials or for other applications, such as the preparation of unreinforced blocks or shaped articles by molding.

TABLE 3

| | | Solvent (1) | | Raw Product | | | Devolatilized product | | |
|---|---|---|---|---|---|---|---|---|---|
| $r_A$ | $r_B$ | T.D | T.THF | Mw | Mn | I | Mw | Mn | I |
| 2 | 0.4 | + | | 4,600 | 700 | 6.6 | 8,000 | 860 | 9.2 |
| | | | + | 3,900 | 540 | 7.3 | 13,000 | 680 | 19 |
| 3.3 | 0.4 | + | | 3,800 | 700 | 5.4 | 5,300 | 800 | 6.5 |
| | | | + | 6,100 | 540 | 11.3 | 4,700 | 450 | 10.5 |

The product was devolatilized by treating it at 60° C. at a pressure of P=0.133 Pa. The product obtained after devolatilization remained liquid.

$r_A$ is the ratio of the number of moles of $MeViSiCl_2$ to the number of moles of $Me_2SiCl_2$.

$r_B$ is the ratio of the number of moles of $Me_3SiCl$ to the number of moles of $MeViSiCl_2$ and $Me_2SiCl_2$.

(1) solvent T.D: mixture of solvents: 75% toluene and 25% dioxane;

solvent T.THF: mixture of solvents: 86% toluene and 14% tetrahydrofuran.

COMPARATIVE EXAMPLE 7

This example relates to the synthesis of polysilanes from the monomers $Me_3SiCl$ and $MeViSiCl_2$:

(a) either by the process of EP-B-0,123,934 (the process used in Example 1 of this patent, in a mixture of xylene and tetrahydrofuran): Process A;

(b) or by the process of the present invention, by carrying out the procedure of Example 1: Process B.

The results are reported in the Table 4 which follows:

TABLE 4

| $r_1 = \dfrac{Me_3SiCl}{MeViSiCl_2}$ | Process | Insoluble fraction (%) | Major fraction (% of state indicated) | Distillable fraction (%) (volatile materials) | $Me_nSi[MeViSi]_n$—$Me_3$ n = 2 | n = 3 |
|---|---|---|---|---|---|---|
| 0.67 | A | 4.5 | 41 thermoplastic | 24 | — | — |
| | B | 12 | 53 liquid | 22 | 60% | 40% |
| 1 | A | — | 30 thermoplastic | 25 | 24% | 70% |
| | B | <3 | 53 liquid | 22 | 70% | 30% |
| 1.4 | A | 3.6 | 47 thermoplastic | 25.8 | — | — |
| | B | 3 | 45 liquid | 15 | 70% | 30% |

$r_1$ has the significance given above.
The volatile materials were distilled from the raw product at a temperature of 60° C. at a pressure of P = 0.133 Pa.

COMPARATIVE EXAMPLE 6

The procedure of Example 1 was repeated, but using as the initial monomers: $MeViSiCl_2$, $Me_3SiCl$ and $Me_2SiCl$ and varying the solvents and the ratios of the silane monomers.

This demonstrated the influence of the solvent on molecular weights and polydispersity index. The results are reported in the Table 3 which follows:

COMPARATIVE EXAMPLE 8

This example relates to the synthesis of polysilanes from the monomers $Me_3SiCl$, $MeViSiCl_2$ and $MeHSiCl_2$ with $r_2=3.3$ and $r_3=0.4$:

(a) either by the process of the present invention: Reference 1;

(b) or by the process of EP-B-0,123,934 using a solvent mixture of 75% toluene and 25% dioxane: Reference 2;

(c) or by the process of EP-B-0,123,934 using a solvent mixture of 86% xylene and 14% tetrahydrofuran: Reference 3.

The results are reported in Table 5 which follows:

TABLE 5

| | Operating process | | | Raw product | | | Devolatilized product | | | Volatile materials (%) |
|---|---|---|---|---|---|---|---|---|---|---|
| Reference | Solvent | Filtration | water/THF + (HCl) | Appearance | GPC Mw | Mn | Appearance | GPC Mw | Mn | |
| 1 | T.D | + | — | amber liquid | 3,080 4,500 I = 5.6–7.7 | 550 580 | viscous amber liquid | 3,600 I = 5.6 | 700 | 10 |
| 2 | T.D | — | + | viscous amber liquid | 24,700 I = 27 | 920 | amber solid | — | — | 10 |

TABLE 5-continued

| | Operating process | | water/THF + (HCl) | Raw product | | | Devolatilized product | | | Volatile materials (%) |
|---|---|---|---|---|---|---|---|---|---|---|
| | | | | | GPC | | | GPC | | |
| Reference | Solvent | Filtration | | Appearance | Mw | Mn | Appearance | Mw | Mn | |
| 3 | T.THF | — | + | heterogeneous fraction, milky and viscous | 13,800 24,000 I = 19–34 | 710 700 | nonpourable and milky | 30,000 I = 30 | 1,100 | 20 |

The devolatilized product was obtained from the raw product by distillation of the volatile materials at a temperature of from 100° and 120° C. at a pressure P = 0.133 Pa.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the preparation of a low viscosity, crosslinkable polysilane that is liquid at ambient temperatures and essentially free of volatiles, comprising (a) reacting at least one silane monomer of the formula (1):

$$R^1R^2SiCl_2 \quad (1)$$

in which $R^1$ is a hydrogen atom or a hydrocarbon radical and $R^2$ is a vinyl radical, with at least one organic or organosilicon monochlorinated comonomer, in the presence of molten sodium in an organic solvent and wherein the ratio $r_1$ of the number of moles of said silane monomer of formula (1) to the number of moles of said monochlorinated comonomer ranges from 0.5 to 2 and said solvent comprises toluene and dioxane, (b) cooling the reaction medium and separating same into (i) a liquid phase which comprises said solvent and the major fraction of low molecular weight polysilane in liquid and/or dissolved state and (ii) a solid phase which comprises sodium, sodium chloride and high molecular weight polysilane, and (c) recovering desired low viscosity polysilane from said liquid phase.

2. The process as defined by claim 1, comprising oxidizing the sodium present in said solid phase after said cooling and separating of (i) and (ii) in step (b).

3. The process as defined by claim 1, said solvent consisting essentially of toluene and dioxane.

4. The process as defined by claim 1, wherein step (a) further comprises reacting in addition to said at least one silane monomer of formula (1) at least one chlorosilane of the formula (2):

$$R^1HSiCl_2 \quad (2)$$

in which $R^1$ is a hydrogen atom or a hydrocarbon radical.

5. The process as defined by claim 4, wherein the ratio $r_2$ of the number of moles of said silane monomer of formula (1) to the number of moles of said chlorosilane of formula (2) ranges from 2 to 3.3 and the ratio $r_3$ of the number of moles of said monochlorinated comonomer to the combined number of moles of the silane monomer and chlorosilane of formulae (1) and (2), respectively, ranges from 0.2 to 0.8.

6. The process as defined by claim 5, said monochlorinated comonomer comprising benzyl chloride and the ratio $r_3$ ranging from 0.2 to 0.6.

7. The process as defined by claim 1, said monochlorinated comonomer comprising benzyl chloride.

8. The process as defined by claim 5, said monochlorinated comonomer having the formula (3):

$$R^1_3SiCl \quad (3)$$

in which $R^1$ is a hydrogen atom or a hydrocarbon radical and the ratio $r_3$ ranges from 0.4 to 0.8.

9. The process as defined by claim 4, wherein the respective molar proportions of the silane monomer of formula (1), the chlorosilane of formula (2) and the monochlorinated comonomer are about 0.76:0.24:0.4.

10. The process as defined by claim 1, comprising separating said reaction medium by filtration.

11. The process as defined by claim 1, further comprising crosslinking said recovered low viscosity polysilane.

12. A low molecular weight, crosslinkable polysilane comprising the polymerizate reaction product of at least one silane monomer of the formula (1):

$$R^1R^2SiCl_2 \quad (1)$$

in which $R^1$ is a hydrogen atom or a hydrocarbon radical and $R^2$ is a vinyl radical, with at least one organic or organosilicon monochlorinated comonomer, wherein the ratio $r_1$ of the number of moles of said silane monomer of formula (1) to the number of moles of said monochlorinated comonomer ranges from 0.5 to 2, said crosslinkable polysilane being liquid at ambient temperatures and essentially free of volatiles.

13. The crosslinkable polysilane as defined by claim 12, having a viscosity of less than about 20 poises at ambient temperatures and less than about 1 poise at 100° C.

14. The crosslinkable polysilane as defined by claim 12, endblocked by said monochlorinated comonomer.

15. The crosslinkable polysilane as defined by claim 14, said monochlorinated comonomer comprising benzyl chloride.

16. The crosslinkable polysilane as defined by claim 12, said polymerizate further comprising at least one chlorosilane monomer of the formula (2):

$$R^1HSiCl_2 \quad (2)$$

in which $R^1$ is a hydrogen atom or a hydrocarbon radical.

17. The crosslinkable polysilane as defined by claim 12, said monochlorinated comonomer having the formula (3):

$$R^1_3SiCl \quad (3)$$

in which $R^1$ is a hydrogen atom or a hydrocarbon radical.

18. The polysilane as defined by claim 12, in thermosetting crosslinked state.

19. The process as defined by claim 11, further comprising thermally converting the crosslinked polysilane into a silicon carbide ceramic material.

20. The low viscosity, crosslinkable polysilane product of the process as defined by claim 1.

21. A polymer blend comprising admixture of the crosslinkable polysilane as defined by claim 12 and a polysilane homopolymer which comprises recurring $-SiR^1H-$ structural units, in which $R^1$ is a hydrogen atom or a hydrocarbon radical.

22. The polymer blend as defined by claim 21, said polysilane homopolymer comprising the polymerizate of a monomer of the formula $R^1HSiCl_2$ with benzyl chloride.

23. The polymer blend as defined by claim 22, said polysilane homopolymer having been prepared in an organic solvent comprising molten sodium, in the presence of sodium iodide.

24. A shaped article comprising the crosslinkable polysilane as defined by claim 12.

25. A shaped article comprising the polymer blend as defined by claim 21.

26. A shaped article comprising the thermosetting polysilane as defined by claim 18.

* * * * *